March 11, 1941.　　　C. J. HUGHEY　　　2,234,698
ENLARGING CAMERA
Filed Dec. 31, 1938　　　2 Sheets-Sheet 2

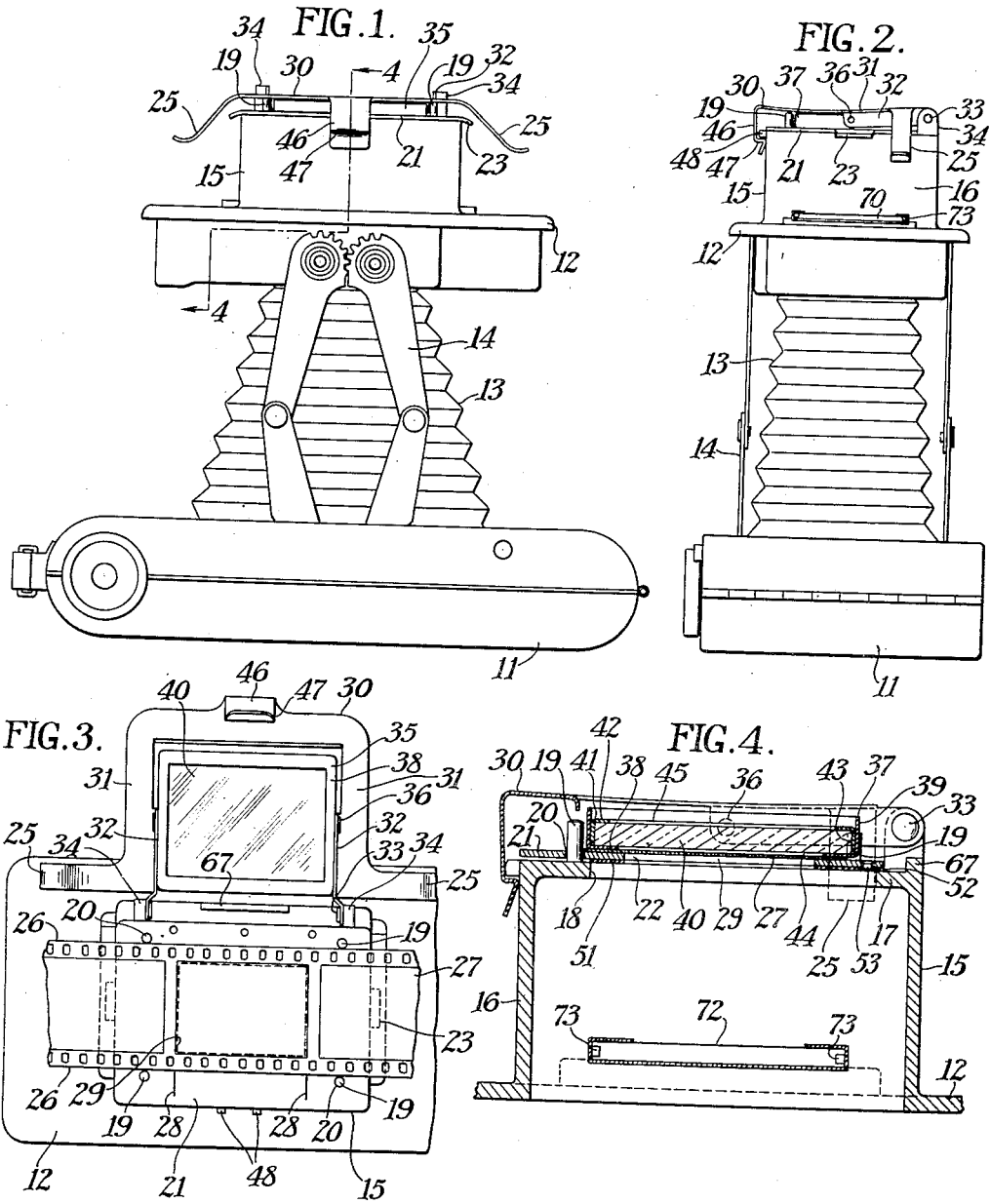

CARTER J. HUGHEY
INVENTOR
BY
ATTORNEYS

Patented Mar. 11, 1941

2,234,698

UNITED STATES PATENT OFFICE 2,234,698

ENLARGING CAMERA

Carter J. Hughey, Rochester, N. Y., assignor to Eastman Kodak Company, Rochester, N. Y., a corporation of New Jersey Application December 31, 1938, Serial No. 248,767

13 Claims. (Cl. 88—24)

The present invention relates to an enlarging apparatus, and more particularly to a device for making enlarged negatives from single frames of 35-mm. color transparencies or similar miniature film which has been processed to a positive.

An object of the present invention is the provision of an enlarging device of the class described which is adapted for use with miniature picture areas or frames in strip form.

Another object of the invention is the provision of a device for accurately positioning and holding such single frames so that an enlargement may be made therefrom.

A further object of the invention is the provision of an arrangement by which single positive areas cut from a strip may be accurately positioned and securely held to permit enlargement negatives to be made therefrom.

A still further object of the invention is the provision in such an enlarger of an arrangement by which color separation negatives may be made.

Yet another object of the invention is the provision in such an enlarger of an arrangement for holding and positioning a single film area which is mounted between glass in a film holder or mount.

Another object of the invention is the provision of an enlarger which is adapted to make enlargements from unmounted single image areas, or from single areas mounted in a holder, or from single image areas arranged in a continuous strip of film.

Another object of the invention is the provision of a device of the class described in which separate picture frames or image areas may be quickly and easily positioned, and when so positioned are held in a plane to permit enlargements to be made therefrom, yet may be readily moved or removed to bring another image area into position for enlarging.

Another object of the invention is the provision of such a device which is simple in construction, inexpensive to manufacture, and highly effective in use.

To these and other ends, the invention resides in certain improvements and combinations of parts, all as will be hereinafter more fully described, the novel features being pointed out in the claims at the end of the specification.

In the drawings:

Fig. 1 is a side elevation view of a conventional roll film camera of the folding type, with the camera in the open or operative position, showing the relation thereto of a miniature film holding device constructed in accordance with the present invention;

Fig. 2 is an end view of the device illustrated in Fig. 1;

Fig. 3 is a plan view of the device illustrated in Figs. 1 and 2, with the clamping member in the unlatched position, showing the relation of the various parts;

Fig. 4 is a vertical sectional view through a portion of the device illustrated in Fig. 1, but on a larger scale than the latter and taken substantially on the line 4—4 of Fig. 1, showing the relation of the parts of a film holder device constructed in accordance with the preferred embodiment of the invention;

Similar reference numerals throughout the various views indicate the same parts.

Figure 5:
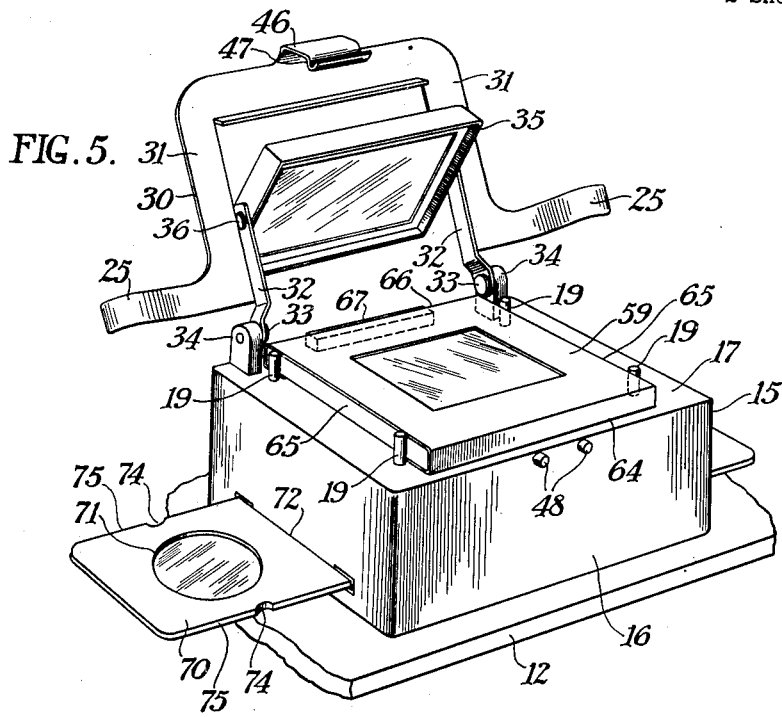
Fig. 5 is a perspective view of the film holding device of the present invention, on a larger scale than Fig. 1, with the tension spring clamp in open position and the diffusing plate swung on its pivots, and showing the arrangement for positioning and retaining a film holder in position to make enlarged negatives of a positive film image mounted between glass in a holder.

The present invention is embodied, in the present instance, in an apparatus which is primarily intended for making enlarged black and white or color separation negatives on a strip of negative roll film from 35-mm. color transparencies or similar other miniature film areas which have been processed to a positive.

The apparatus of the present invention comprises, broadly, a roll film camera of the conventional collapsible or foldable type, on the front of which is mounted the film holding device of the present invention. While this device is primarily intended for making enlarged negatives from 35-mm. color transparencies or other suitable miniature positive film, it is apparent that the device is equally well adapted for making enlarged positives from miniature negatives. The fundamental idea is the making of an enlargement, either positive or negative, from a single miniature image area.

Fig. 1 of the drawings shows a conventional roll film camera of the folding type which forms the body of the enlarger. This camera comprises the usual back or roll film holding portion 11, an extendable front 12 which is secured to the back 11 by means of the usual expanding bellows 13 and lazy tongs 14.

Figure 7:
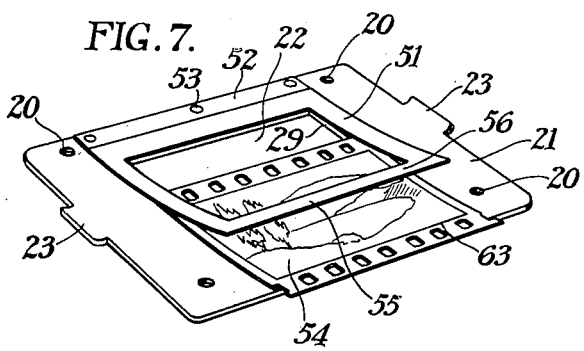
Fig. 7 is a perspective view of one side of one of the aperture plates, showing the spring clip for retaining individual film or picture areas in position on the plate.

The front 12 carries the enlarger lens and shutter, not shown, and has formed integral therewith a forwardly extending tubular portion or member 15 having side walls 16 and a top or closure member 17 having a light transmission aperture 18, all as shown in Figs. 1 and 4. The top 17 has formed thereon a plurality of rectangularly arranged positioning pins 19 which are adapted to extend through registering openings 20 formed in an apertured plate member 21, Fig. 7, which may be mounted on and supported by the top 17, as shown in Fig. 4. In order to adapt the device for use with 35-mm. films having different size image areas, a plurality of aperture plates 21, only one of which is shown, may be provided. Each of these plates is provided with a central framing aperture 22 of such size as to frame the particular image area of the film to be enlarged. When the plate 21 is in position, as shown in Fig. 4, the aperture 22 thereof overlies the aperture 18 in the top 17, the latter being of such size to accommodate the largest aperture 22 which is to be used with the device. To facilitate the removal and replacement of the aperture plate members 21, the latter are provided with finger-gripping lugs 23 formed on the opposite ends thereof, as best shown in Fig. 7.

The pins 19 extend above the plate 21, as shown in Fig. 4, and serve to engage the opposite marginal edges 26 of a film strip 27 to laterally align the picture or image area of the strip with the aperture 22 of the plate 21, as is apparent from an inspection of Fig. 3. The plate 21, on the other hand, is provided with a pair of engraved lines 28 which are in alignment with the opposite edges 29 of the aperture 22 and serve to longitudinally align the image area of the strip with the aperture 22. The pins 19 and lines 28 thus cooperate to accurately position and align the image area in registry with the aperture 22 so that an enlargement may be made of the positive image area. Such an arrangement also permits the enlargement of the desired image area to be made from the strip without necessitating the cutting or damaging of the latter. After the image area has been enlarged, the film strip may be slid longitudinally on the plate 21 to bring the next or any desired image area of the film strip into registry with the aperture 22 of the plate 21 so that the next enlargement may be made.

Figure 6:
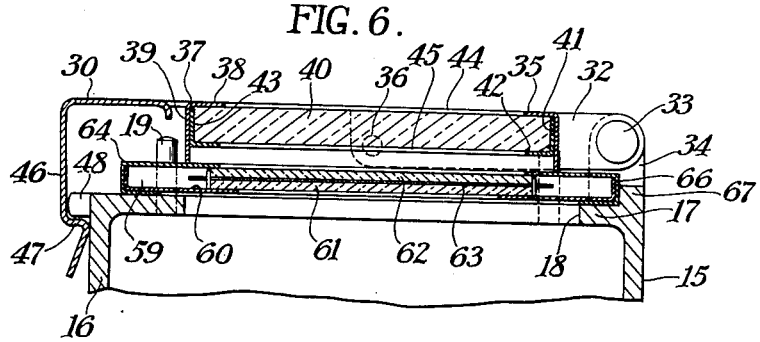
Fig. 6 is a view similar to Fig. 4, but showing the members in position to retain the film holder, as shown in Fig. 5, in position.

A U-shaped metal clamp or tension spring 30 is provided with a pair of spaced side members or arms 31 each of which is provided with a bent up portion or lug 32 pivoted at 33 to an upstanding stud 34 formed on the top 17, as best shown in Fig. 5. A light-diffusing frame, generally indicated by the numeral 35, is pivoted or swingably mounted at 36—36 on the lugs 32, see Fig. 5. This frame comprises a rectangular dish-shaped member 37 having a bottom 38 and upwardly extending side walls 39. A light-diffusing member in the form of a flashed opal glass disk 40 is positioned on the bottom 38 and is held thereon by an inverted rectangular dish-shaped member 41 having a bottom 42 engaging the upper surface of the disk 40 and downwardly extending side walls 43 which frictionally engage the inner surfaces of the side walls 39 of the member 37 to retain the diffusing glass disk in position in the frame 35, as best shown in Figs. 4 to 6. The bottoms 38 and 42 are provided with registering apertures 44 and 45 respectively in alignment with the aperture 22 of the plate 21, as best shown in Figs. 4 to 6. Opposite sides 39 of the member 37 are pivoted at 36—36 to the lugs 32, see Fig. 5. The dish-shaped member 37 is slightly deeper than the member 41, as shown in Figs. 4 and 6, the purpose of which construction will be hereinafter pointed out.

When the parts are in the position shown in Fig. 4, the bottom 38 of the dish-shaped member 37 engages the film strip 27 and cooperates with the apertured plate 21 to retain the image area of the film strip in flat position over the aperture 22, the advantages of which are well known to those in the art. In order to secure the parts in the assembled relation, shown in Fig. 4, the front end of the clamp 30 is provided with a spring latch 46, the free end of which is provided with an off-set portion or shoulder 47 arranged to resiliently engage lugs 48 on the front side of the tubular extension 15, see Figs. 4 to 6, to releasably secure the parts in film clamping position. In a badly curled film strip, the unclamped portion thereof may tend to curl up over the clamp 30 and thus obstruct the light rays which pass through the diffusing disk 40. In order to prevent such obstruction, the clamp 30 is provided with a pair of outwardly extending curved arms 25 which guide the unclamped portion of the film strip to prevent the latter from curling over the clamp 30.

While the above arrangement provides a device by which single image areas of a film strip may be easily, and readily enlarged, it is often desirable to enlarge separate miniature image areas which have been cut or separated from the film strip. To this end, the present invention provides an arrangement whereby these single or separate image areas may be accurately positioned and aligned in registry with the aperture 22 of the plate 21 and securely held in adjusted position during the enlarging operation. To secure this result, the side of the plate 21 opposite to that shown in Fig. 3 is provided with a hollow rectangular flexible clip 51 which is secured along one edge 52, by means of rivets 53 or other suitable fastening means, to the plate 21, as clearly shown in Fig. 7. When a single image area 54 is to be enlarged, the front edge 55 of the clip 51 is raised, and the image area 54 is inserted thereunder, in the manner clearly illustrated in Fig. 7. When the image area 54 is positioned in registry with the aperture 22 of the plate 21, the clamp 30 is lowered to the position shown in Fig. 4 to bring the bottom 38 of the member 37 into engagement with the upper face 56 of the clip 51 to clamp the image area 54 between the clip 51 and the plate 21 to maintain the image area in flat position over the aperture 22, as is apparent. Such an arrangement thus enables enlargements to also be made from separate image or picture areas which have been cut or otherwise detached from a film strip, such as shown at 27, in Fig. 3.

Single miniature positive transparencies are often mounted in some form of a holder, generally shown at 59, Fig. 5, so that they may be projected in a suitable projector. These holders not only provide a suitable support for the positive film such as color transparencies, but also protect the latter in that a layer of glass is positioned on both sides of the film. Such a holder is shown and described in Patent Number 2,088,944, to Mr. D'Arcy Young, and comprises a tray-like film holding member 60 in which are positioned two layers of glass 61 and 62 between which the single positive transparency 63 is positioned, see Fig. 6. A closure member 64 slidably engages the tray-like member 60 to retain the parts in assembled relation. As the specific structure of this holder does not constitute a part of the present invention, reference may be had to the above-mentioned Young patent for a detailed disclosure thereof. Such a holder is shown, in Figs. 5 and 6 merely by way of illustration, as one form of a holder which may be used with the device embodied in the present invention. Obviously other forms of transparency mounts or holders may also be used.

It is often desirable to make an enlargement from a positive transparency which is positioned in a holder 59 of the type above described without necessitating or requiring the removal of the transparency from the holder or mount. The device embodied in the present application is admirably adapted to make such enlargements while the film or transparency is retained in position in its holder.

Fig. 6 shows such a holder in position to make such an enlargement. In comparing Fig. 6 with Fig. 4, it is apparent that the image area in the former figure is spaced a slightly greater distance away from the top 17 than the image area in Fig. 4. However, the lower glass 61 of the holder 59 acts as a lens to slightly increase the focal length of the camera lens so that even though the image in Fig. 6 is moved upwardly a slight amount, it is still in sharp focus by reason of the presence of the lower glass protecting slide 61.

In order to make an enlargement of a single transparency 63, the holder or mount 59 is positioned as shown in Fig. 5 so that the pins 19 engage the opposite side 65 of the holder. The latter is now slid to the rear until the rear edge 66 engages a lug 67 on the top 17. The holder is now positioned so that an enlarged negative may be made of the transparency 63. In order to securely retain the holder 59 in position it is necessary that clamp 30 be moved to the position shown in Fig. 6 to bring the shoulder 47 into locking engagement with the lugs 48. It is apparent, however, that due to the increased thickness of the holder 59 over the plate 17, it is difficult to engage the shoulder 47 with the lug 48 when the frame 35 is in the position shown in Fig. 4. In order to overcome this difficulty, the frame 35 is pivotally or swingably mounted at 36—36 on the clamp 30. In order to compensate for the increased thickness of the holder 59, the frame 35 is eccentrically mounted on the lugs 32 so that when reversed or flipped over the parts are in the position shown in Fig. 6. In this position the holder 59 is held by reason of the engagement therewith of the top edges of the sides 39 of the disk-shaped member 37. By thus eccentrically mounting the frame 35, film strips or film holders may be selectively used for making enlarged negatives. In either case, the positioned film or transparency is in proper focus.

In making negatives from color positives, it is often desirable to make various color separation negatives. These color separation negatives are then utilized in preparing a colored positive by a method which is known as the "wash-off relief process," which process does not constitute a part of the present invention. In order to make these color separation negatives, suitable color filters are placed between the transparency and the negative, in a manner well known to those in the art. Usually three color filters are used, namely, blue, red, and green. If desired, a fourth filter may be used for increasing contrast in the negatives, but such a filter is used only in connnection with miniature black and white negatives.

In order to enable such color separation negatives to be made, the present invention provides a color slide 70 provided with a series of circular openings 71, only one of which is shown in Fig. 5. Color filters of the proper color are secured in place in the openings 71. The slide 70 is then inserted through a slot 72 formed in the opposite side 16 of the tubular extension 15 to position the proper filter below and in alignment with the camera lens and the transparency to be enlarged, as is apparent to those in the art. The slide 70 may be held in adjusted position by small spring members 73, see Fig. 4, which engage notches 74 formed in the opposite edges 75 of the slide, as clearly illustrated in Fig. 5.

It is thus apparent from the above description that the present invention provides a device by which enlarged negatives may be made from miniature color transparencies or similar positive transparencies. These miniature positives may be in the form of a film strip, or separate image areas, or transparencies mounted more or less permanently in a suitable holder. It is also apparent that the enlarged negatives may be easily and quickly made. In all cases, the light source for making the enlargements is positioned above the camera so that the light rays thereof will pass through the light-diffusing disk 40 which provides uniform illumination for the transparency being enlarged. The above described device provides an ideal arrangement by which enlarged color separation negatives may be secured from a miniature colored positive.

While one embodiment of the invention has been disclosed, it is to be understood that the inventive idea may be carried out in a number of ways. This application, therefore, is not to be limited to the precise details described, but is intended to cover all variations and modifications thereof falling within the scope of the appended claims.

I claim:

1. A photographic enlarging apparatus comprising, in combination, a fixed focus camera, a tubular extension member on the front of said camera, an apertured film supporting plate member positioned on said extension member, means for detachably securing said plate member in position on said extension member, aligning pins on one of said members arranged to engage the marginal edges of a film strip to laterally align an image area thereof with said aperture, and means secured to said extension member and cooperating with said plate member for holding said image area in flat position over said aperture.

2. A photographic enlarging apparatus comprising, in combination, a fixed focus camera, a tubular extension member on the front of said camera, an apertured film supporting plate member positioned on said extension member, means on one of said members for detachably securing said plate member on said extension member and for engaging opposite edges of a film strip to laterally align an image area thereof with the aperture in said plate member, and a clamping member hingedly mounted on said extension member and cooperating with said plate member to clamp a film strip therebetween to hold an image area thereof in flat position over said aperture.

3. A photographic enlarging apparatus comprising, in combination, a fixed focus camera, a tubular extension member on the front of said camera, an apertured film supporting plate member positioned on said extension member, positioning pins on said extension member arranged to extend through registering openings in said plate member to position the latter on said extension member, said pins projecting above said plate to engage the marginal edges of a film strip to laterally align an image area thereof in registry with said aperture, and a clamping member mounted on said extension member and arranged to engage said film strip inside said pins to hold said area in flat position over said aperture.

4. A photographic enlarging apparatus comprising, in combination, a fixed focus camera, a tubular extension member on the front of said camera, an apertured film supporting plate member positioned on said extension member, means including positioning pins on said extension member for detachably securing and positioning said plate member in position thereon, and a hollow resilient member on said plate for holding a single film image area in registry with said aperture.

5. A photographic enlarging apparatus comprising, in combination, a fixed focus camera, a tubular extension member on the front of said camera, an apertured film supporting plate member positioned on said extension member, means for detachably securing said plate member in position on said extension member, a spring clip mounted on said plate to hold a single film area in flat position over said aperture, said clip having an opening in registry with said aperture, and light diffusing means carried by said extension member.

6. A photographic enlarging apparatus comprising, in combination, a fixed focus camera, a tubular extension member on the front of said camera, an apertured film supporting plate member positioned on said extension member, means for detachably securing said plate member in position on said extension member, aligning pins on one of said members arranged to engage the marginal edges of a film strip to laterally align an image area thereof with said aperture, a tension spring hingedly mounted on said extension member, a diffusing glass frame pivotally mounted on said spring and cooperating with said plate to hold said area in flat position over said aperture, and a light diffusing disk carried by said frame.

7. A photographic enlarging apparatus comprising, in combination, a fixed focus camera, a tubular extension member on the front of said camera, an apertured film supporting plate member positioned on said extension member, positioning pins on said extension member arranged to extend through registering openings in said plate member to position the latter on said extension member, said pins projecting above said plate to engage the marginal edges of a film strip to laterally align an image area thereof in registry with said aperture, a tension spring hingedly mounted on said extension member, a diffusing glass frame reversibly mounted on said spring and cooperating with said plate to clamp said film to hold said image area in flat position over said aperture, means on said spring arranged to engage said extension member to releasibly hold said spring in film clamping position, and a diffusing glass disk carried by said frame.

8. A photographic enlarging apparatus comprising, in combination, a fixed focus camera, a tubular extension member on the front of said camera, an apertured film supporting plate member positioned on said extension member, means for detachably securing said plate member in position on said extension member, a spring clip mounted on said plate to hold a single film image area in flat position on said plate and in registry with said aperture, said clip having an opening in registry with said aperture, a tension spring hingedly mounted on said extension member, a reversible frame eccentrically mounted on said spring and arranged to engage said clip to hold said area flat on said plate, and a light diffusing member carried by said frame.

9. A photographic enlarging apparatus comprising, in combination, a fixed focus camera, a tubular extension member on the front of said camera, a film holder removably positioned on said extension member, means on said member arranged to engage opposite edges of said holder, separate means on said member cooperating with said means for positioning said holder on said member, and clamping means arranged to overlie said holder and cooperating with said means for retaining said holder in position on said member.

10. A photographic enlarging apparatus comprising, in combination, a fixed focus camera, a tubular extension member on the front of said camera, a film holder removably positioned on said extension member, positioning members on said extension members adapted to engage edges of said holder to position the latter on said extension member, a tension spring hingedly secured to said extension member, a reversible diffusing glass frame swingably mounted on said spring and arranged to engage said holder to clamp the latter between said extension member and frame, and a light diffusing disk eccentrically mounted in said frame.

11. A photographic enlarging apparatus comprising, in combination, a fixed focus camera, a tubular extension member on the front of said camera, a film holder removably positioned on said extension member, rectangularly arranged pins on said extension member positioned to engage opposite sides of said holder, a lug on said extension member arranged to engage another side of said holder and cooperating with said pins to position the holder on said extension member, a tension spring hingedly mounted on said extension member, a frame reversibly mounted on said spring and having portions thereof arranged to engage said holder to clamp the latter in position on said extension member, and a glass diffusing disk mounted in said frame and spaced from said holder.

12. A photographic enlarging apparatus comprising, in combination, a fixed focus camera, a tubular extension member on the front of said camera, an apertured film supporting plate member positioned on said extension member, means for detachably securing said plate member in position on said extension member, aligning pins on one of said members positioned to engage the marginal edges of a film strip to laterally align an image area thereof with said aperture, said extension member being formed with a transversely extending slot, a color slide arranged to be slidably mounted in said slot, said slide being provided with color filters adapted to be selectively positioned in alignment with said area, and means cooperating with said plate member for holding said image area flat over said aperture.

13. A photographic enlarging apparatus comprising, in combination, a fixed focus camera, a tubular extension member on the front of said camera, a film holder removably positioned on said member, means on said member for positioning said holder thereon, means on said holder for increasing the focal length of the lens of said camera, said extension member being formed with a transversely extending slot spaced from said holder, a color slide arranged to be positioned in said slot, said slide being provided with color filters adapted to be selectively positioned in alignment with said area, and means on said extension member for clamping said holder in position thereon.

CARTER J. HUGHEY.